(12) United States Patent
Negrea et al.

(10) Patent No.: US 10,762,112 B2
(45) Date of Patent: Sep. 1, 2020

(54) ESTABLISHING SEARCH RADIUS BASED ON TOKEN FREQUENCY

(71) Applicant: Microsoft Technology Licensing, LLC, Redmond, WA (US)

(72) Inventors: Mihai Negrea, Romania (RO); Florin Sabau, Bellevue, WA (US); Bodin Dresevic, Bellevue, WA (US); Sameer S. Mutatkar, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 985 days.

(21) Appl. No.: 14/698,584

(22) Filed: Apr. 28, 2015

(65) Prior Publication Data

US 2016/0321298 A1    Nov. 3, 2016

(51) Int. Cl.
*G06F 7/00* (2006.01)
*G06F 16/29* (2019.01)
*G06F 16/903* (2019.01)

(52) U.S. Cl.
CPC ........ *G06F 16/29* (2019.01); *G06F 16/90335* (2019.01)

(58) Field of Classification Search
CPC ....................................................... G06F 16/29
See application file for complete search history.

(56) References Cited

U.S. PATENT DOCUMENTS 5,162,802 A * 11/1992 Zuniga .................. G01S 13/726
                                                                342/96
6,108,650 A   8/2000 Musk et al.
(Continued)

FOREIGN PATENT DOCUMENTS

KR    20100062073 A    6/2010
KR    20140062685 A    5/2014
RU       2184984 C2    7/2002

OTHER PUBLICATIONS

Labrou, et al., "Yahoo! as an Ontology—Using Yahoo! Categories to Describe Documents", Proceedings of the Eighth International Conference on Information and Knowledge Management, Nov. 1999, 8 pages.

(Continued)

*Primary Examiner* — Eliyah S. Harper
(74) *Attorney, Agent, or Firm* — Shook Hardy & Bacon L.L.P.

(57) ABSTRACT

Systems, methods, and computer-readable storage media are provided for establishing a search radius based on token frequency. A search query having a geographic indication is received and it is determined whether or not the received query contains one or more non-frequent tokens. Non-frequent tokens have a respective frequency that occurs in the entities included in a data store of entities below a threshold number of times. If it is determined that the received query does not contain one or more non-frequent tokens, the search radius established for the search query, and thus applied to the search, is restricted to a radius established based upon the geographic indication of the query. If it is determined that the received query does contain one or more non-frequent tokens, the search radius is established such that it is larger than if it was established based upon the geographic indication of the query.

20 Claims, 7 Drawing Sheets

(56) References Cited

U.S. PATENT DOCUMENTS

| | | | |
|---|---|---|---|
| 7,921,108 B2 | 4/2011 | Wang et al. | |
| 8,195,653 B2 | 6/2012 | Dandekar et al. | |
| 8,255,217 B2 | 8/2012 | Stent et al. | |
| 8,626,759 B2 | 1/2014 | Anderson et al. | |
| 8,676,798 B1 | 3/2014 | Datta et al. | |
| 8,838,621 B1 | 9/2014 | Yagnik | |
| 10,509,096 B2* | 12/2019 | Lin | G01S 5/02 |
| 2007/0118520 A1 | 5/2007 | Bliss et al. | |
| 2007/0266005 A1* | 11/2007 | Blommesteijn | G06F 16/9537 |
| 2008/0154876 A1 | 6/2008 | Hao | |
| 2008/0243821 A1 | 10/2008 | Delli et al. | |
| 2009/0222438 A1 | 9/2009 | Strandell et al. | |
| 2009/0265340 A1* | 10/2009 | Barcklay | G06F 16/9537 |
| 2009/0307198 A1 | 12/2009 | Zhang et al. | |
| 2010/0121838 A1* | 5/2010 | Tankovich | G06F 17/30864 |
| | | | 707/715 |
| 2011/0106439 A1* | 5/2011 | Huang | G06F 3/0488 |
| | | | 701/532 |
| 2011/0184981 A1 | 7/2011 | Lu et al. | |
| 2012/0131031 A1* | 5/2012 | Xie | G06F 16/9032 |
| | | | 707/765 |
| 2012/0154579 A1* | 6/2012 | Hampapur | G06T 7/277 |
| | | | 348/143 |
| 2012/0218102 A1* | 8/2012 | Bivens | G08B 25/009 |
| | | | 340/539.13 |
| 2013/0227383 A1* | 8/2013 | Kim | G06F 40/20 |
| | | | 715/201 |
| 2013/0246392 A1 | 9/2013 | Farmaner et al. | |
| 2013/0325329 A1* | 12/2013 | Gupta | G01C 21/32 |
| | | | 701/450 |
| 2014/0095532 A1 | 4/2014 | Timm et al. | |
| 2014/0229468 A1 | 8/2014 | Or et al. | |
| 2015/0339848 A1* | 11/2015 | Barnes | G06F 16/29 |
| | | | 345/629 |
| 2016/0117348 A1* | 4/2016 | Reynertson | G06F 16/29 |
| | | | 707/769 |
| 2016/0192150 A1* | 6/2016 | Plasmeier | G06F 16/23 |
| | | | 455/456.1 |

OTHER PUBLICATIONS

Materna, et al., "A Bayesian Approach to Query Language Identification", Proceedings of Fifth Workshop on Recent Advances in Slavonic Natural Language Processing, Dec. 2, 2011, 6 pages.

Feng, Junlan, "Location-Aware Query Parsing for Mobile Voice Search", IEEE International Conference on Acoustics, Speech and Signal Processing, May 22, 2011, pp. 5728-5731.

* cited by examiner

ESTABLISHING SEARCH RADIUS BASED ON TOKEN FREQUENCY

BACKGROUND

Local search permits users to perform geographically constrained searches against data stores having information about local entities (establishments, attractions, or anything on the map). Local search queries may include information about what a user is searching for (e.g., keywords, establishment categories, names of products, and the like) as well as information about the location from which a user is searching and/or the location around which a user desires the search result relevance to be concentrated. Local searches may include an explicit location reference explicitly stating a location in the query itself (for instance, "Hotels in Seattle"). Local searches also may include an implicit location reference, for instance, making reference to a product or service that is typically consumed locally, such as "restaurant" or "barber shop."

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for establishing a search radius based on token frequency. A search query having a geographic indication is received, such geographic indication being exhibited either explicitly or implicitly, and it is determined whether or not the received search query contains one or more non-frequent tokens (frequency being based upon, for instance, one or more performance or relevance measures, as more fully described below). "Tokens," as the term is utilized herein, refers to single words or combinations of words that make up a received query. If it is determined that the received query does not contain one or more non-frequent tokens, the search radius established for the search query, and thus applied to the search, may be restricted to a radius established based upon the geographic indication in the query. If it is determined that the received query does contain one or more non-frequent tokens, the search radius may be established such that it is larger than if it was established based upon the geographic indication of the query.

Relaxing or expanding the search radius in those instances where non-frequent tokens are present in a received search query but not in those instances where only frequent tokens are present permits search results that are likely to satisfy the search query but occur outside of a local, geographically-constrained search radius to be surfaced for received queries for which there are likely not satisfactory local search results. Relaxing or expanding the search radius as described herein also enhances the speed of finding relevant entities that satisfy a search query in that fewer entities are considered potential result candidates (e.g., sorted, ranked, and the like) in those cases where the search query contains only frequent tokens, thus indicating that the user likely intended to have surfaced products or services that are typically consumed locally.

BRIEF DESCRIPTION OF THE DRAWINGS

Certain embodiments of the present invention are illustrated by way of example and not limitation in the accompanying figures in which like reference numerals indicate similar elements and in which.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As previously stated, local search permits users to perform geographically constrained searches against data stores having information about local entities (e.g., establishments, attractions, or anything on the map). Many existing local search systems enhance the speed of finding desired entities by utilizing a search radius that restricts the result candidates to be sorted. A "search radius" refers to a distance from a particular geographic location that forms a radius of a circular area having the particular geographic location at its center, the circular area defining a search area. That is, searches restricted in accordance with a particular search radius are performed only against those entities included within the circular search area defined by the search radius. These systems often surface satisfactory results for search queries where the location of the desired entity is known, being explicitly specified by the user in the query, and utilized as the particular geographic location around which the search area is centered. However, when the user does not specify a location, the default behavior often is to center the search around the location from which the query is received, such location being based upon, for instance, Global Positioning System (GPS) signals obtained utilizing a GPS associated with the user computing device, information contained in the computing device IP address, and the like. However, some user queries are intended to locate information about entities that are geographically distant from the user's current location. In such cases, search systems employing the above methodology fail because they do not locate the desired entity within a certain radius from the user's location.

By way of example, suppose a user located in Seattle, Wash. submits the search query "Taj Mahal" with no explicit location information. If a local search engine conducts a search based upon the query and implicit location information based upon the user's current location (the location from which the query was received), the result candidates would likely include, for instance, travel agencies, but may not include results having information about the Taj Mahal mausoleum located in India—as India is outside of the likely local search radius. However, upon submitting a query consisting of only the words "Taj Mahal," there is a reasonable likelihood that the user actually intended to view information related to the Indian burial place.

Prior local search solutions have been designed to address this issue. One such solution involves repeatedly and incrementally increasing the search radius until at least one satisfactory result is located. This solution has drawbacks, however. For instance, it induces latency due to multiple search calls. Further, an inadequate but technically satisfactory result may be found in an early search iteration causing the search radius expansion to cease, although the correct (i.e., reasonably most likely) result hasn't yet been found. For instance, returning to the first example above, a travel agency that has the words "Taj Mahal" in its entity information may be a technically accurate result to the query but the travel agency is still most likely not what the user is looking for.

Other prior solutions use various query classifiers to predict if a received search query should have a relaxed (i.e., larger or broader) search radius relative to a search radius based upon location information associated with the query. That is, such solutions employ classifiers that are configured to ascertain if the user is looking for a named entity or for a class/category of entities that are local entities or entities that are generally remote from the user's query-submitting location. Solutions employing these methodologies also have drawbacks. For instance, classifier accuracy is not always acceptable and sometimes named entity queries also produce a large number of candidates, introducing latency.

In various embodiments, systems, methods, and computer-readable storage media are provided herein for establishing a search radius based on token frequency. A search query having a geographic indication is received, such geographic indication being exhibited either explicitly or implicitly, and it is determined whether or not the received query contains one or more non-frequent tokens. "Tokenization" refers to the process of breaking a stream of text into words, phrases, symbols, or other meaningful elements called "tokens." In accordance with certain embodiments hereof, "tokens" may be "unigrams," that is, comprised of a single meaningful element, "bigrams," comprised of a two-element combination, "three-grams," comprised of a three-element combination, and so forth. In further accordance with certain embodiments hereof, contiguous strings of alpha-numeric characters separated by whitespace, such as a space or line break, or punctuation signals may comprise single elements (i.e., words). Thus, as used herein, "tokens" may be "unigrams" (comprised of single words), "bigrams" (comprised of two contiguous words), "three-grams" (comprised of three contiguous words), and so on. It will be understood by those having ordinary skill in the art that the systems and methods described herein may be equally applicable to meaningful elements other than words, for instance, syllables.

Tokens may be determined to be "non-frequent" when they occur in association with less than or equal to a threshold number of entities for which there is information in an entity index. Thresholds may be predetermined as desired, for instance, by a system administrator, and may be the same for all locations or vary based upon an identification of each particular location. In certain embodiments, thresholds may be based upon interplay between performance and relevance measures. For example, a token that is considered "non-frequent" when it occurs in association with less than or equal to too many entities (e.g., one million entities), may suffer in terms of performance due to some queries necessitating too much time to produce results. At the other extreme, if a token is considered "non-frequent" when it occurs in association with less than or equal to too few entities (e.g., one hundred entities), relevance measures may not show any appreciable gain. In particular embodiments hereof, appropriate thresholds are determined such that performance measures and relevance measures are satisfactorily balanced.

If it is determined that the received query does not contain one or more non-frequent tokens, the search radius established for the search query, and thus applied to a search, may be restricted to a search radius established based upon the geographic indication of the query. In certain embodiments, the determined search radius may be a default search radius that generally is applied to all searches where all the tokens comprising the query are determined to be frequent tokens. In certain embodiments, the determined search radius may be determined utilizing a first radius-determining mechanism (e.g., a mechanism that takes into account location population, the number of entities within a given circular distance from the center of the search circle, or the like). In certain embodiments, the determined search radius may be defined as a first search radius that differs from and is generally smaller than a second search radius, as more fully described below.

If it is determined that the received query does contain one or more non-frequent tokens, the search radius may be established such that it is larger than if it was established based upon the geographic indication of the query. In certain embodiments, the determined search radius in this instance may be a default search radius that generally is applied to all searches where at least one of the tokens comprising the query is determined to be a non-frequent token. In certain embodiments, the determined search radius may be determined utilizing a second radius-determining mechanism (e.g., a mechanism that takes into account location population, the number of entities within a given circular distance from the center of the search circle, or the like), the second radius-determining mechanism differing from the first radius-determining mechanism. In certain embodiments, the determined search radius may be defined as a second search radius that differs from and is generally larger than the first search radius.

Accordingly, exemplary embodiments are directed to systems for establishing a search radius based on token frequency. Such systems comprise a search radius establishing engine having one or more processors and one or more computer-readable storage media, and at least one data store coupled with the search radius establishing engine. The search radius establishing engine is configured to receive a search query, such search query having a geographic indication associated therewith either implicitly (e.g., referencing a product or service that is typically consumed locally, such as a restaurant or movie theater) or explicitly (i.e., clearly stating a location in the query itself). The search radius establishing engine further is configured to determine that the received query contains one or more non-frequent tokens, and to establish the search radius based upon the determination that the received query contains one or more non-frequent tokens, the search radius being larger than if it was determined that the received query failed to contain one or more non-frequent tokens (i.e., larger than if the search radius was determined based upon the geographic indication and without meaningful regard for token frequency).

Other exemplary embodiments are directed to methods for establishing search radii, the methods being performed by one or more computing devices including at least one processor. Such methods include receiving a search query, the search query having a geographical indication implicitly or explicitly associated therewith; determining that the received search query contains one or more non-frequent unigrams; and establishing a search radius based upon the determination that the received query contains one or more non-frequent unigrams, the search radius being larger than if it was determined that the received search query failed to contain one or more non-frequent unigrams (i.e., larger than if the search radius was determined based upon the geographical indication and without meaningful regard for unigram frequency).

Yet other exemplary embodiments are directed to computerized systems for establishing search radii, such systems comprising one or more sensors (e.g., GPS sensors, IP address sensors, and the like) that provide a location indicator associated with a computing device. That is, certain systems in accordance herewith comprise one or more sensors configured to obtain and provide an indication of the geographic location of the computing device. Certain systems in accordance herewith further comprise a search engine that receives a query from the computing device and provides one more search results in response to the received query; one or more processors; and one or more computer storage media storing computer-useable instructions. When used by the one or more processors, the computer-useable instructions cause the one or more processors to perform operations comprising: determining that the received query fails to contain one or more non-frequent unigrams; determining that the received query contains one or more non-frequent bigrams; and establishing a search radius based on the location indicator and the determination that the received query contains one or more non-frequent bigrams, the search radius being larger than if it was determined that the received query failed to contain one or more non-frequent bigrams.

Having briefly described an overview of embodiments of the present invention, an exemplary operating environment in which at least exemplary embodiments may be implemented is described below in order to provide a general context for various aspects of the present invention. Referring to the figures in general and initially to FIG. 1 in particular, an exemplary operating environment for implementing embodiments of the described technology is shown and designated generally as computing device 100. The computing device 100 is but one example of a suitable computing environment and is not intended to suggest any limitation as to the scope of use or functionality of embodiments hereof. Neither should the computing device 100 be interpreted as having any dependency or requirement relating to any one component nor any combination of components illustrated.

Embodiments of the present invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Exemplary embodiments of the invention may be practiced in a variety of system configurations, including, but not limited to, hand-held devices, consumer electronics, general-purpose computers, more specialty computing devices, and the like. Exemplary embodiments also may be practiced in distributed computing environments where tasks are performed by remote-processing devices that are linked through a communications network.

Figure 1:
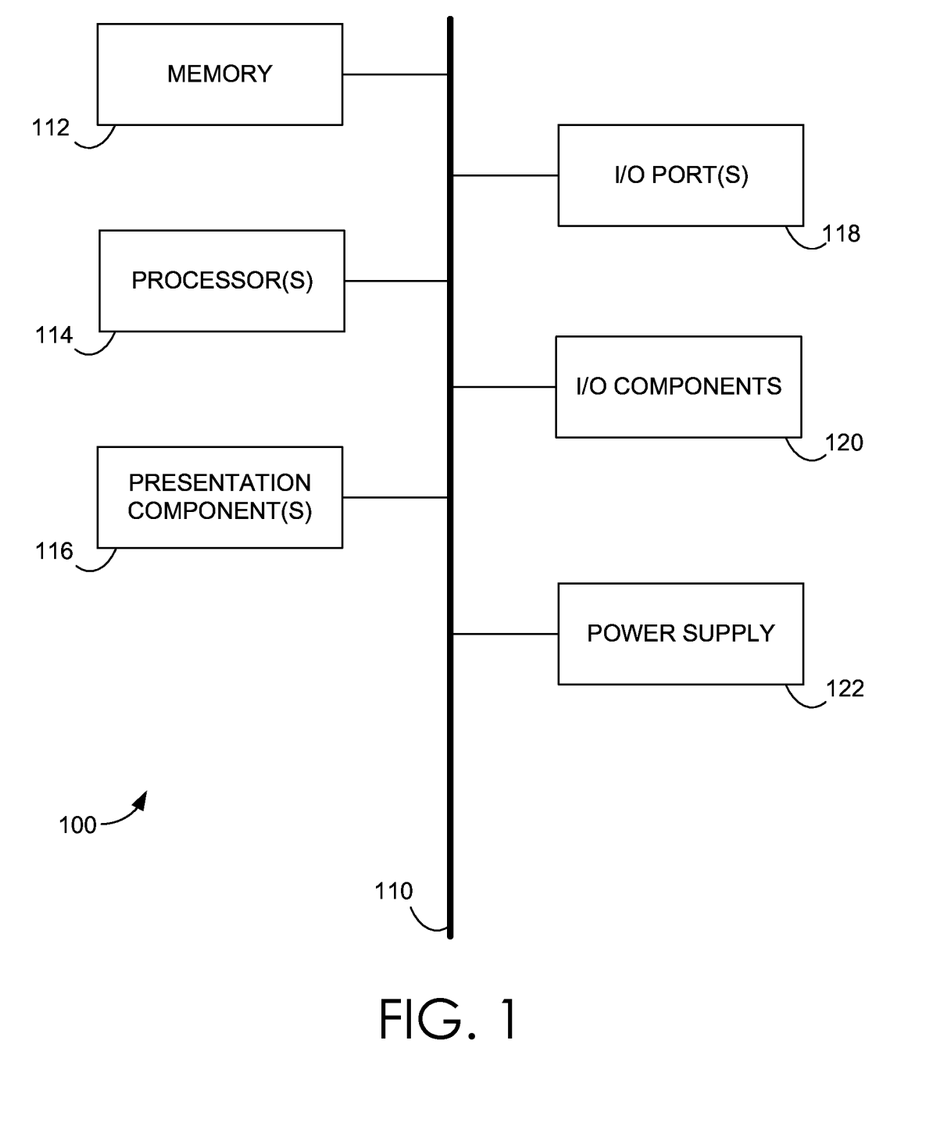
FIG. 1 is a block diagram of an exemplary computing environment suitable for use in implementing embodiments of the present invention.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more exemplary embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, wireless device, a controller, such as a stylus, a keyboard and a mouse, a natural user interface (NUI), and the like.

A NUI processes air gestures (i.e., gestures made in the air by one or more parts of a user's body or a device controlled by a user's body), voice, or other physiological inputs generated by a user. These inputs may be interpreted as authentication requests, identity provider selections, and the like presented by the computing device 100. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices. The computer-useable instructions form an interface to allow a computer to react according to a source of input. The instructions cooperate with other code segments to initiate a variety of tasks in response to data received in conjunction with the source of the received data.

As previously set forth, exemplary embodiments of the present invention provide systems, methods, and computer-readable storage media for establishing a search radius based upon token frequency.

Figure 2:
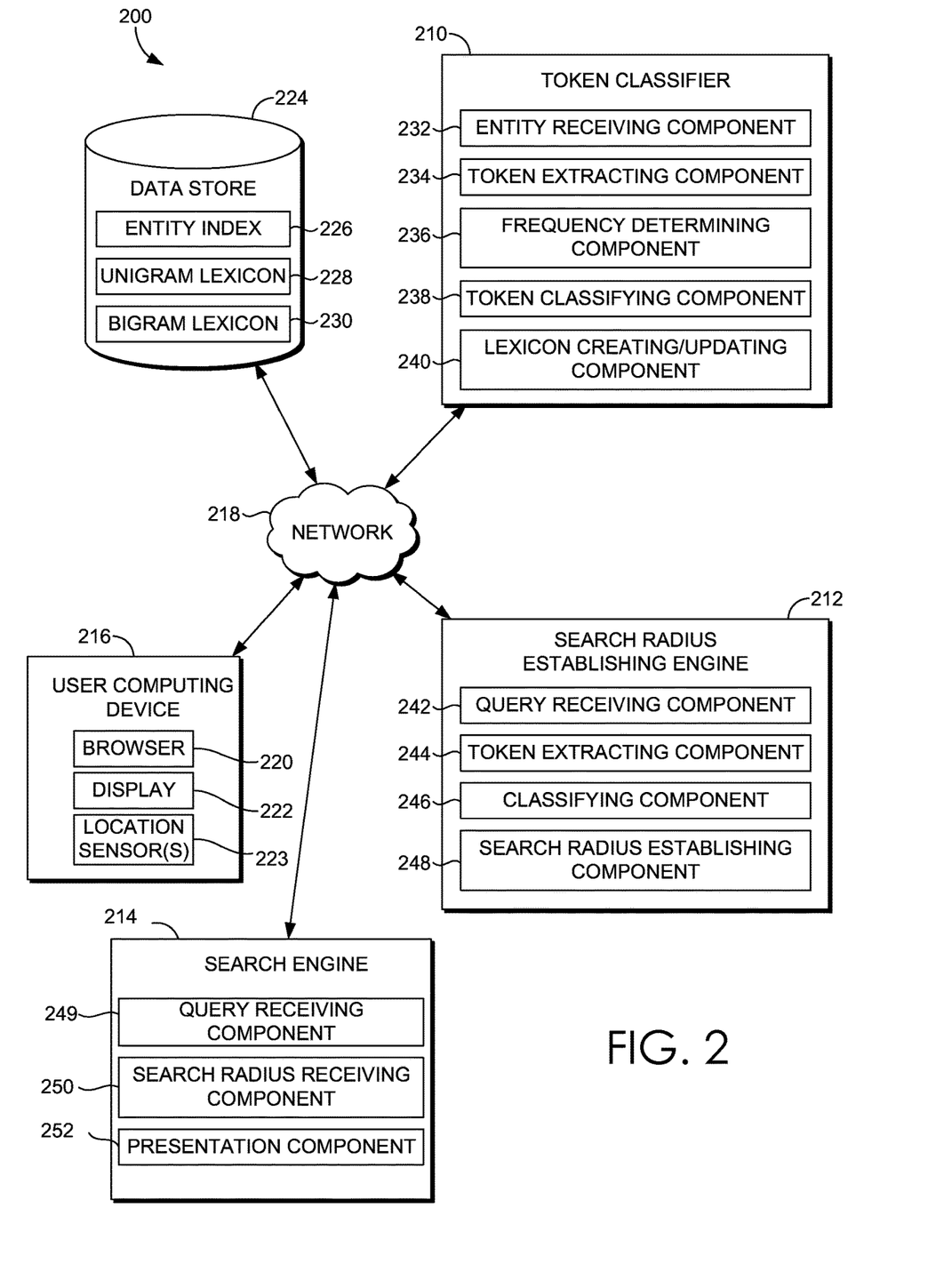
FIG. 2 is a block diagram of an exemplary computing system in which embodiments of the invention may be employed.

Referring now to FIG. 2, a block diagram is provided illustrating an exemplary computing system 200 in which certain embodiments of the present invention may be employed. Generally, the computing system 200 illustrates an environment in which a locally-restricted search radius may be applied or relaxed based, at least in part, upon the frequency of tokens occurring in a received search query. Among other components not shown, the computing system 200 generally includes a token classifier 210, a search radius establishing engine 212, a search engine 214, and a user computing device 216, all in communication with one another via a network 218. The network 218 may include, without limitation, one or more local area networks (LANs) and/or wide area networks (WANs). Such networking environments are commonplace in offices, enterprise-wide computer networks, intranets and the Internet. Accordingly, the network 218 is not further described herein.

It should be understood that any number of token classifiers 210, search radius establishing engines 212, search engines 214, and/or user computing devices 216 may be employed in the computing system 200 within the scope of embodiments of the present invention. Each may comprise a single device/interface or multiple devices/interfaces cooperating in a distributed environment. For instance, the search radius establishing engine 212 may comprise multiple devices and/or modules arranged in a distributed environment that collectively provide the functionality of the search radius establishing engine 212 described herein. Additionally, other components or modules not shown also may be included within the computing system 200.

In some embodiments, one or more of the illustrated components/modules may be implemented as stand-alone applications. In other embodiments, one or more of the illustrated components/modules may be implemented via the token classifier 210, the search radius establishing engine 212, the search engine 214, the user computing device 216, or as an Internet-based service. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located in association with any number of token classifiers 210, search radius establishing engines 212, search engines 214, or user computing devices 216. By way of example only, the token classifier 210 might be provided as a single computing device (as shown), a cluster of computing devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The user computing device 216 may include any type of computing device, such as the computing device 100 described with reference to FIG. 1, for example. Generally, the user computing device 216 includes a browser 220 and a display 222. The browser 220, among other things, is configured to render search engine home pages (or other online landing pages) and search engine results pages (SERPs), in association with the display 222 of the user computing device 216. The browser 220 further is configured to receive user input of requests for various web pages (including search engine home pages), receive user input search queries (generally input via an I/O component, such as a stylus or keypad, and/or via a user interface presented on the display 222 and permitting alpha-numeric and/or textual input into a designated search input region) and to receive content for presentation on the display 222, for instance, from the search radius establishing engine 212. It should be noted that the functionality described herein as being performed by the browser 220 may be performed by any other application, application software, user interface, or the like capable of rendering Web content. It should further be noted that embodiments of the present invention are equally applicable to mobile computing devices and devices accepting gesture, touch and/or voice input. Any and all such variations, and any combination thereof, are contemplated to be within the scope of embodiments of the present invention.

The user computing device 216 further includes one or more location sensors 223 configured to sense or determine geographic intent associated with received search queries. Such geographic intent may be determined based upon explicitly exhibited geographic signals (i.e., geographic information included within the query itself) or implicitly exhibited geographic signals (e.g., based upon reference to products or services that are typically consumed locally, such as "restaurant" or "barber shop"). The location sensors 223 further are configured to determine the appropriate geographic indication in those instances where the geographic signals are implicit, for instance, utilizing GPS associated with the user computing device, information contained in the computing device IP address, or the like.

The token classifier 210 is configured to extract tokens from information associated with a plurality of entities and classify the extracted tokens as frequent or non-frequent. In this regard, the token classifier 210 has access to a data store 224 having an entity index 226 associated therewith configured to store information pertaining to a plurality of entities (e.g., establishments, attractions, locations on a map, etc.). Such information may include, without limitation, entity names or titles, addresses, telephone numbers, internet addresses, and any other entity identifying information as desired. As illustrated, the data store 224 further includes a unigram lexicon 228 and a bigram lexicon 230, both of which are further described below. In embodiments, the data store 224 is configured to be searchable for one or more of the items stored in association therewith. It will be understood and appreciated by those of ordinary skill in the art that the information stored in association with the data store may be configurable and may include any information relevant to, by way of example only, entities, tokens, token frequencies, and the like. The content and volume of such information are not intended to limit the scope of embodiments of the present invention in any way. Further, the data store 224 may be a single, independent component (as shown) or a plurality of storage devices, for instance a database cluster, portions of which may reside in association with the token classifier 210, the search radius establishing engine 212, the search engine 214, the user computing device 216, another external computing device (not shown), and/or any combination thereof.

As illustrated, the token classifier 210 includes an entity receiving component 232, a token extracting component 234, a frequency determining component 236, a token classifying component 238, and a lexicon creating/updating component 240. The entity receiving component 232 is configured to receive information pertaining to one or more entities for which classification is desired, for instance, from the entity index 226. The entity receiving component 232 may receive such entity information based upon querying the index, based upon information pushes from the entity index 226, or any combination thereof.

The token extracting component 234 is configured to extract tokens from the entity information. As previously stated, "tokenization" refers to the process of breaking entity information comprised of a stream of text into words, phrases, symbols, or other meaningful elements called "tokens." In accordance with certain embodiments hereof, "tokens" may be "unigrams," that is, comprised of a single meaningful element, "bigrams," comprised of a two-element combination, "three-grams," comprised of a three-element combination, and so forth. In further accordance with certain embodiments hereof, contiguous strings of alpha-numeric characters separated by whitespace, such as a space or line break, or punctuation signals may comprise single elements (i.e., words). Thus, as used herein, "tokens" may be "unigrams" (comprised of single words), "bigrams" (comprised of two contiguous words), "three-grams" (comprised of three contiguous words), and so on. It will be understood by those having ordinary skill in the art that the systems and methods described herein may be equally applicable to meaningful elements other than words, for instance, syllables.

The frequency determining component 236 is configured to determine the number of entities with which each token extracted by the token extracting component 234 is associated, that is, the token frequency with respect to the entity index 226. The token classifying component 238 is configured to classify each token as "frequent" or "non-frequent" based upon the frequency determined by the frequency determining component 236. Tokens may be determined to be "non-frequent" when they occur in association with less than or equal to a threshold number of entities for which there is information in the entity index 226 and "frequent" when they occur in association with greater than or equal to a threshold number of entities. In certain embodiments, thresholds may be based upon interplay between performance and relevance measures. For example, a token that is considered "non-frequent" when it occurs in association with less than or equal to too many entities (e.g., one million entities), may suffer in terms of performance due to some queries necessitating too much time to produce results. At the other extreme, if a token is considered "non-frequent" when it occurs in association with less than or equal to too few entities (e.g., one hundred entities), relevance measures may not show any appreciable gain. In particular embodiments hereof, appropriate thresholds are determined such that performance measures and relevance measures are satisfactorily balanced. In embodiments, thresholds may be predetermined as desired by a system administrator generally taking into account performance and relevance considerations such as the amount of information that may be cached for rapid retrieval in response to search queries, and the like.

The frequency classifications may be stored in association with token lexicons for use by the search radius establishing engine 212, as more fully described below. As such, the lexicon creating/updating component 240 is configured to create one or more token lexicons for storage in association with the data store 224. As illustrated, the data store 224 includes two token lexicons, a unigram lexicon 228 and a bigram lexicon 230. The unigram lexicon 228 may include one or both of a frequent unigram lexicon and a non-frequent unigram lexicon. In certain embodiments, the unigram lexicon 228 is a lexicon of frequent unigrams. The bigram lexicon 230 similarly may include one or both of a frequent bigram lexicon and a non-frequent bigram lexicon. In certain embodiments, the bigram lexicon 230 is a lexicon of non-frequent bigrams. The lexicon creating/updating component 240 may be configured to update or regenerate the unigram lexicon 228 and the bigram lexicon 230 at regular intervals, for instance, at every data publish.

In embodiments, the token classifier 210 is configured to compute token frequency offline and store the classification lexicons (unigram lexicon 228 and bigram lexicon 230) in memory. Storing lexicons containing only frequent or non-frequent tokens as described herein decreases memory usage enabling more rapid retrieval of information at run time. In embodiments, memory usage may be further decreased by sorting the tokens alphabetically, eliminating duplicates, and/or aggregating frequency counts.

With continued reference to FIG. 2, the search radius establishing engine 212 is configured to receive run-time search queries and establish a search radius for each received query. As illustrated, the search radius establishing engine 212 includes a query receiving component 242, a token extracting component 244, a classifying component 246, and a search radius establishing component 248. The query receiving component 242 is configured to receive a search query, for instance, input into the browser 220 of the user computing device 216. The token extracting component 244 is configured to extract tokens from the received query. In embodiments, the extracted tokens comprise unigrams and bigrams. The classifying component 246 is configured to classify each of the extracted tokens as one of frequent and non-frequent. In embodiments, such classification is accomplished by the classifying component 246 comparing the extracted tokens to token lexicons stored in memory (e.g., the unigram lexicon 228 and the bigram lexicon 230). The search radius establishing component 248 is configured to utilize the token classifications to establish a search radius for the received search query. In embodiments, the search radius established will be larger or broader when the search query fails to contain frequent tokens than if the search query contains one or more frequent tokens. In embodiments, the search radius may be infinitely broadened such that it is as though no search radius is applied at all and the search query is run against the entire entity index 226.

The search engine 214 of FIG. 2 includes a query receiving component 249, a search radius receiving component 250, and a presentation component 252. The query receiving component 249 is configured to receive a search query, for instance, input into the browser 220 of the user computing device 216. The search radius receiving component 250 is configured to receive a search radius for the query, for instance, a search radius determined for the search query by the search radius establishing engine 212. The search engine 214 is configured to conduct the search for the received search query in accordance with the received search radius. The presentation component 252 is configured to distribute at least a portion of the determined search results for presentation in association with the display 222 of the user computing device 216.

Figure 3:
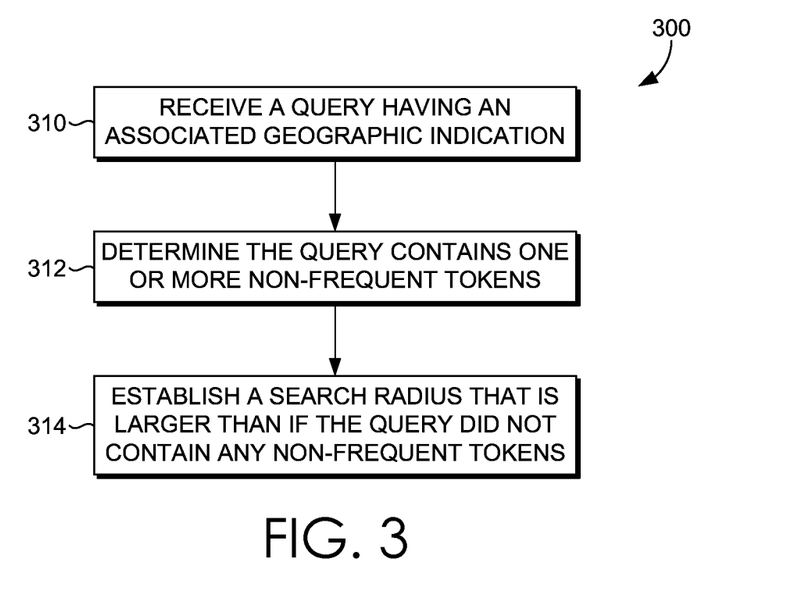
FIGS. 3-6 are flow diagrams showing exemplary methods for establishing a search radius, each in accordance with an embodiment of the present invention.

Turning now to FIG. 3, a flow diagram is illustrated showing an exemplary method 300 for establishing a search radius, in accordance with an embodiment of the present invention. As indicated at block 310, a search query is received (for instance, by the query receiving component 242 of the search radius establishing engine 212 of FIG. 2). In embodiments, the search query includes an explicit and/or implicit geographic indication. As indicated at block 312, it is determined (for instance, utilizing the token extracting component 244 and the classifying component 246 of the search radius establishing engine 212 of FIG. 2) that the query contains one or more non-frequent tokens. As indicated at block 314, a search radius is established (for instance, by the search radius establishing component 248 of the search radius establishing engine 212 of FIG. 2). The established search radius is larger or broader than a search radius that would be established if the query did not contain any non-frequent tokens.

Figure 4:
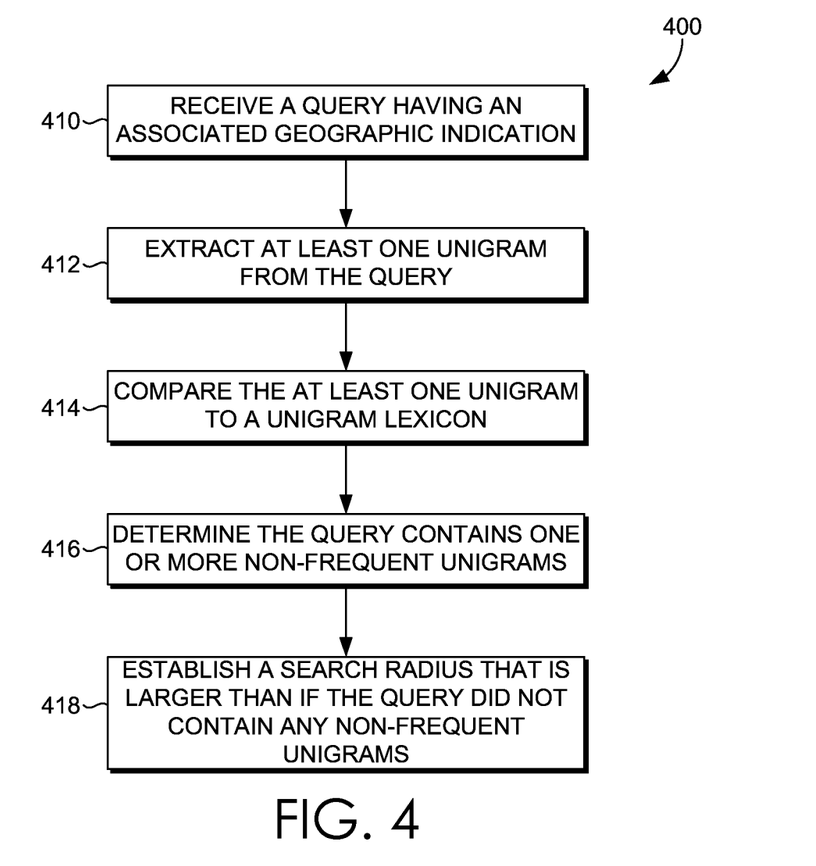

Turning now to FIG. 4, a flow diagram is illustrated showing another exemplary method 400 for establishing a search radius, in accordance with an embodiment of the present invention. As indicated at block 410, a search query is received (for instance, by the query receiving component 242 of the search radius establishing engine 212 of FIG. 2). In embodiments, the search query includes an explicit and/or implicit geographic indication. As indicated at block 412, at least one unigram is extracted from the received search query, e.g., utilizing the token extracting component 244 of the search radius establishing engine 212 of FIG. 2. The extracted unigram is compared to at least one lexicon (for instance, the unigram lexicon 228 of FIG. 2), as indicated at block 414. As indicated at block 416, it is determined (for instance, utilizing the classifying component 246 of the search radius establishing engine 212 of FIG. 2) that the query contains one or more non-frequent unigrams. As indicated at block 418, a search radius is established (for instance, by the search radius establishing component 248 of the search radius establishing engine 212 of FIG. 2). The established search radius is larger or broader than a search radius that would be established if the query did not contain any non-frequent unigrams.

Figure 5:
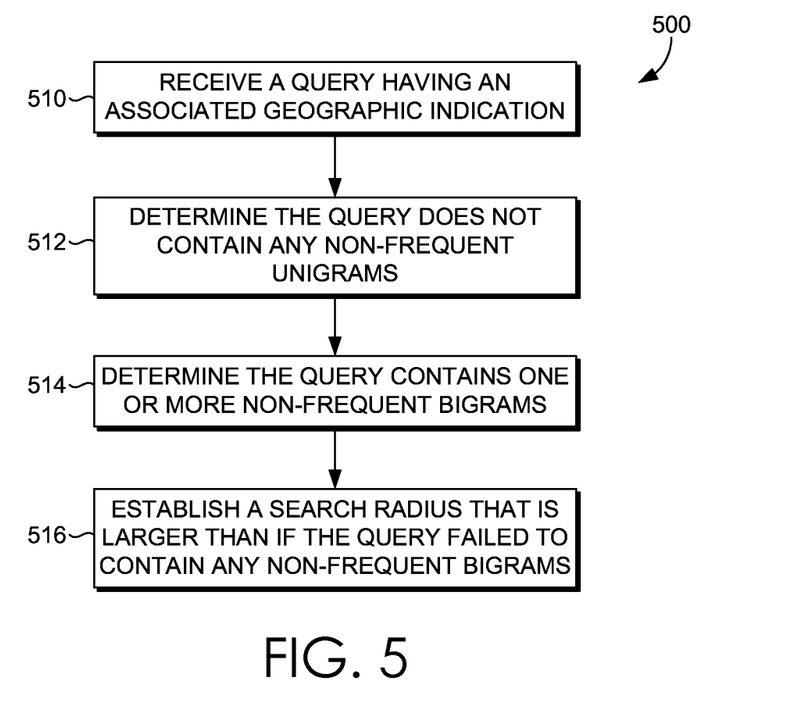

Turning now to FIG. 5, a flow diagram is illustrated showing yet another exemplary method 500 for establishing a search radius, in accordance with an embodiment of the present invention. As indicated at block 510, a search query is received (for instance, by the query receiving component 242 of the search radius establishing engine 212 of FIG. 2). In embodiments, the search query includes an explicit and/or implicit geographic indication. As indicated at block 512, it is determined (for instance, utilizing the classifying component 246 of the search radius establishing engine 212 of FIG. 2) that the query does not contain any non-frequent unigrams, that is, that all of the unigrams contained in the query are frequent unigrams. As indicated at block 514, it is determined (for instance, utilizing the classifying component 246 of the search radius establishing engine 212 of FIG. 2) that the query contains one or more non-frequent bigrams. As indicated at block 516, a search radius is established (for instance, by the search radius establishing component 248 of the search radius establishing engine 212 of FIG. 2). The established search radius is larger or broader than a search radius that would be established if the bigrams contained in the query were all frequent bigrams.

Figure 6:
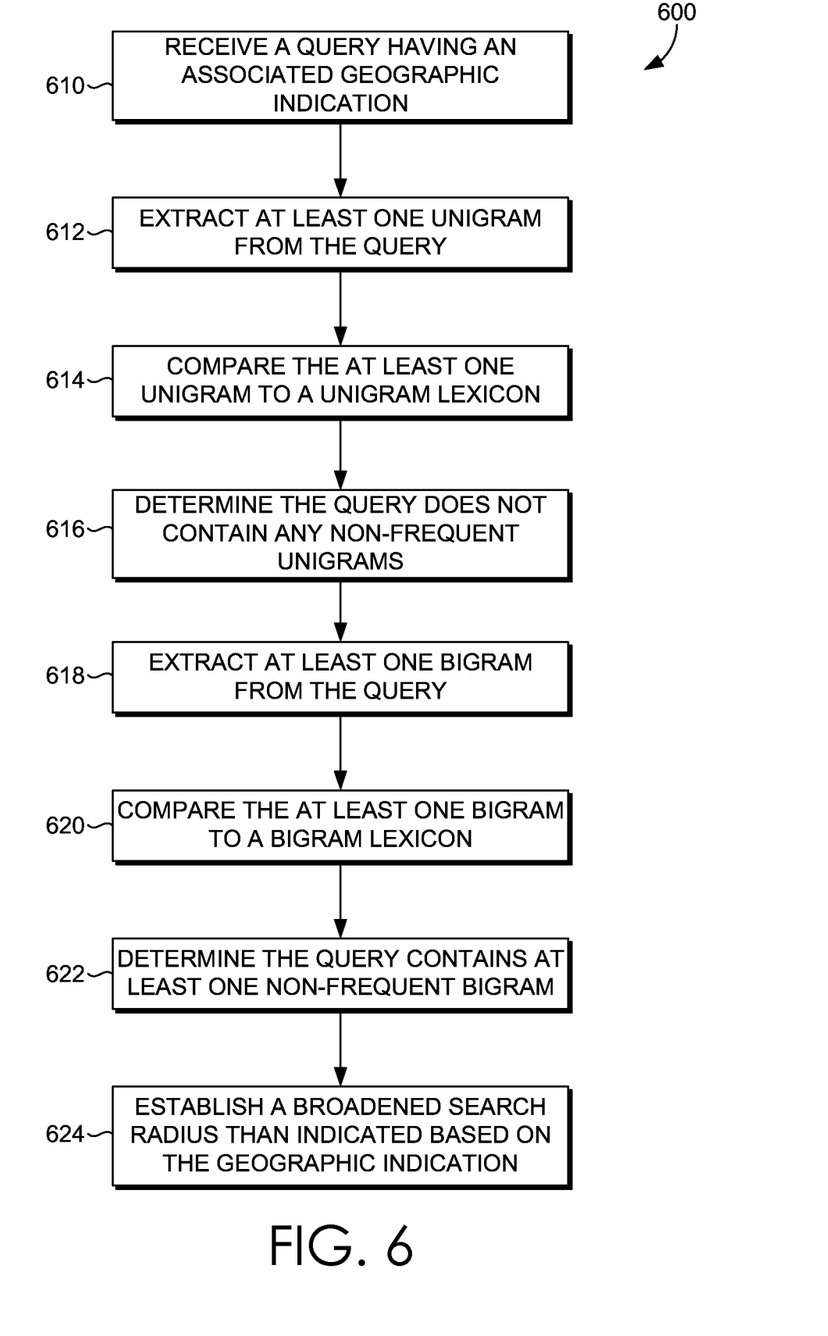

With reference to FIG. 6, a flow diagram is illustrated showing an additional exemplary method 600 for establishing a search radius, in accordance with an embodiment of the present invention. As indicated at block 610, a search query is received (e.g., by the query receiving component 242 of the search radius establishing engine 212 of FIG. 2), the search query including an explicit and/or implicit geographic indication. As indicated at block 612, at least one unigram is extracted from the query, for instance, utilizing the token extracting component 244 of the search radius establishing engine 212 of FIG. 2. The extracted unigram(s) is compared to a unigram lexicon (e.g., the unigram lexicon 228 of FIG. 2), as indicated at block 614. As indicated at block 616, it is determined (for instance, utilizing the classifying component 246 of the search radius establishing engine 212 of FIG. 2) that all of the unigrams contained in the query are frequent unigrams, that is, that the query does not contain any non-frequent unigrams.

As indicated at block 618, at least one bigram is extracted from the query (e.g., utilizing the token extracting component 244 of the search radius establishing engine 212 of FIG. 2). The extracted bigram(s) is compared to a bigram lexicon (e.g., the bigram lexicon 230 of FIG. 2), as indicated at block 620. As indicated at block 622, it is determined (for instance, utilizing the classifying component 246 of the search radius establishing engine 212 of FIG. 2) that the query contains at least one non-frequent bigram. As indicated at block 624, a search radius is established (for instance, by the search radius establishing component 248 of the search radius establishing engine 212 of FIG. 2). The established search radius is larger or broader than a search radius that would be established based upon the geographic indication and without meaningful regard for token frequency.

Figure 7:
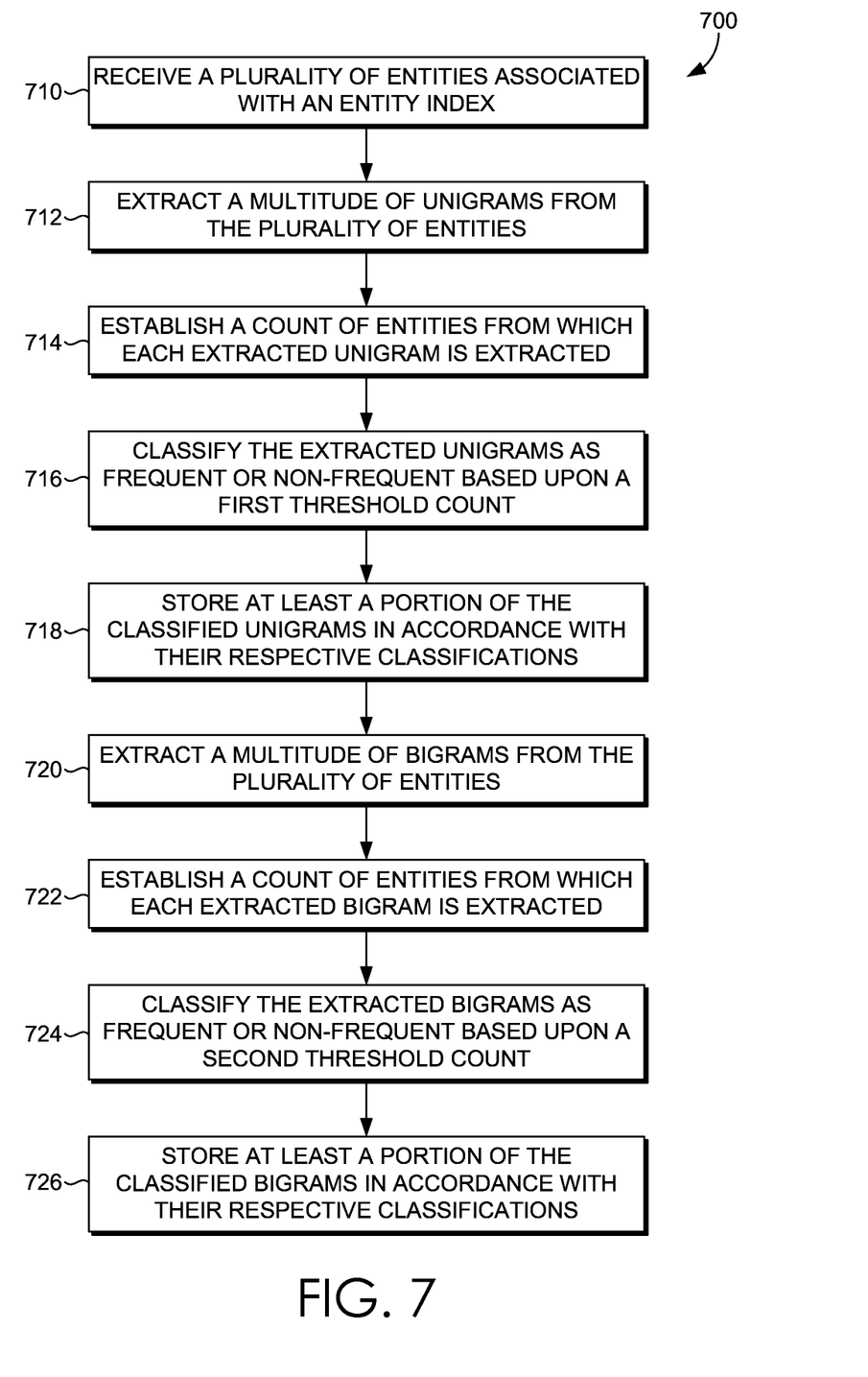
FIG. 7 is a flow diagram showing an exemplary method for classifying entities based upon token frequency, in accordance with an embodiment of the present invention.

With reference to FIG. 7, a flow diagram is illustrated showing an exemplary method 700 for classifying entities based upon token frequency, in accordance with an embodiment of the present invention. As indicated at block 710, a plurality of entities associated with an entity index (e.g., the entity index 226 of FIG. 2) is received, for instance, by the entity receiving component 232 of the token classifier 210 of FIG. 2. As indicated at block 712, a multitude of unigrams is extracted from the plurality of entities, for instance, utilizing the token extracting component 234 of the token classifier 210 of FIG. 2. A count of entities from which each extracted unigram is extracted is established (for instance, utilizing the frequency determining component 236 of the token classifier 210 of FIG. 2), as indicated at block 714. The extracted unigrams are classified as frequent or non-frequent (e.g., utilizing the token classifying component 238 of the token classifier 210 of FIG. 2), such classifications being based upon a first threshold count. This is indicated at block 716. As indicated at block 718, at least a portion of the classified unigrams is stored (e.g., in association with the unigram lexicon 228 of FIG. 2) in accordance with their respective classifications.

As indicated at block 720, a multitude of bigrams is extracted from the plurality of entities, for instance, utilizing the token extracting component 234 of the token classifier 210 of FIG. 2. A count of entities from which each extracted bigram is extracted is established (for instance, utilizing the frequency determining component 236 of the token classifier 210 of FIG. 2), as indicated at block 722. The extracted bigrams are classified as frequent or non-frequent (e.g., utilizing the token classifying component 238 of the token classifier 210 of FIG. 2), such classifications being based upon a second threshold count. This is indicated at block 724. As indicated at block 726, at least a portion of the classified bigrams is stored (e.g., in association with the bigram lexicon 230 of FIG. 2) in accordance with their respective classifications.

As can be understood, certain embodiments of the present invention provide systems, methods, and computer-readable storage media for establishing a search radius based on token frequency. A search query having a geographic indication is received, such geographic indication being exhibited either explicitly or implicitly, and it is determined whether or not the received query contains one or more non-frequent tokens. Non-frequent tokens have a respective frequency that occurs in the entities included in a data store of entities below a threshold number of times. If it is determined that the received query does not contain one or more non-frequent tokens, the search radius established for the search query, and thus applied to the search, may be restricted to a radius established based upon the geographic indication of the query. If it is determined that the received query does contain one or more non-frequent tokens, the search radius may be established such that it is larger than if it was established based upon the geographic indication of the query.

Some specific embodiments of the invention have been described, which are intended in all respects to be illustrative rather than restrictive. Alternative embodiments will become apparent to those of ordinary skill in the art to which the present invention pertains without departing from its scope.

Certain illustrated embodiments hereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 300 of FIG. 3, 400 of FIG. 4, 500 of FIG. 5, 600 of FIG. 6 and 700 of FIG. 7 is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. A system for establishing a search radius based on token frequency, the system comprising:
    a search radius establishing engine having one or more processors and one or more computer-readable storage media; and
    at least one data store coupled with the search radius establishing engine, wherein the search radius establishing engine:
    receives a query;
    determines that the received query contains one or more non-frequent tokens based on breaking the query into tokens, and determining from each token a number of entities associated with an entity index, wherein the one or more non-frequent tokens are determined based on the number of the entities associated with the entity index being less than or equal to a threshold number of the entities in the entity index; and
    establishes the search radius based on the determination that the received query contains one or more non-frequent tokens, the search radius being a distance from a particular geographic location that defines a search area of the query, the search radius and the search area being larger than if it was determined that the received query failed to contain one or more non-frequent tokens, wherein the particular geographic location is based on sensed data from one or more location sensors associated with a computing device.

2. The system of claim 1, wherein the search radius establishing engine determines that the received query contains one or more non-frequent tokens by determining that the received query contains one or more non-frequent unigrams.

3. The system of claim 1, wherein the search radius establishing engine determines that the received query contains one or more non-frequent tokens by determining that the received query fails to contain a non-frequent unigram and contains one or more non-frequent bigrams.

4. The system of claim 1, wherein the search radius establishing engine determines that the received query contains one or more non-frequent tokens by:
  extracting tokens from the received query; and
  comparing the extracted tokens to at least one of a frequent unigram lexicon or a non-frequent bigram lexicon.

5. The system of claim 1, wherein the search radius establishing engine determines that the received query contains one or more non-frequent tokens by:
  extracting unigrams from the received query; and
  comparing the extracted unigrams to at least one of a frequent unigram lexicon and a non-frequent unigram lexicon.

6. The system of claim 5, wherein the search radius establishing engine determines that the received query contains one or more non-frequent tokens by further:
  extracting bigrams from the received query; and
  comparing the extracted bigrams to at least one of a frequent bigram lexicon and a non-frequent bigram lexicon.

7. The system of claim 1, further comprising a token classifier, wherein the token classifier:
  receives a plurality of the entities associated with the entity index;
  extracts tokens from at least a portion of the plurality of the entities;
  classifies at least a portion of the extracted tokens as one of a frequent token or a non-frequent token; and
  stores at least a portion of the classified tokens, each in accordance with its respective classification.

8. The system of claim 7, wherein the token classifier classifies at least the portion of the extracted tokens by:
  establishing a count of the entities of the plurality of entities from which each extracted token is extracted;
  classifying a given token as a frequent token when the count of the entities from which it is extracted meets or exceeds a threshold number; and
  classifying the given token as a non-frequent token when the count of the entities from which it is extracted is below the threshold number.

9. The system of claim 7, wherein the at least one data store includes one or more of at least the entity index and at least one token lexicon.

10. The system of claim 9, wherein the at least one data store includes a plurality of token lexicons, and wherein the plurality of token lexicons includes a frequent unigram lexicon and a non-frequent bigram lexicon.

11. A method being performed by one or more computing devices including at least one processor, the method for establishing a search radius, the method comprising:
  receiving a query, wherein the query comprises at least one token; determining that the at least one token of the received query contains one or more non-frequent unigrams tokens based on the at least one token of the received query occurring less than an entity threshold defined by an entity index; and
  establishing the search radius based on the determination that the least one token of the received query contains one or more non-frequent unigrams, the search radius and a search area being larger than if it was determined that the least one token of the received query failed to contain one or more non-frequent unigrams, wherein the search radius refers to a distance from a particular geographic location that forms a radius of a circular area having the particular geographic location at its center, the circular area defining the search area, wherein the particular geographic location is determined using the one or more sensors that provide the location indicator associated with the computing device.

12. The method of claim 11, further comprising extracting at least one unigram from the received query, wherein determining that the received query contains one or more non-frequent unigrams comprises comparing the at least one unigram to a lexicon including at least one of frequent unigrams and non-frequent unigrams.

13. The method of claim 11, further comprising:
  receiving a plurality of the entities associated with the entity index;
  extracting unigrams from at least a portion of the plurality of the entities;
  classifying at least a portion of the extracted unigrams as one of a frequent unigram or non-frequent unigram; and
  storing at least a portion of the classified unigrams, each in accordance with its respective classification.

14. The method of claim 13, further comprising, for at least a portion of the extracted unigrams, establishing a count of the entities of the plurality of the entities from which each extracted unigram is extracted, wherein classifying the extracted unigrams comprises classifying a given unigram as a frequent unigram if the count of the entities from which it is extracted meets or exceeds a threshold number and classifying the given unigram as a non-frequent unigram if the count of the entities from which it is extracted is below the threshold number.

15. The method of claim 13, wherein storing at least a portion of the classified unigrams, each in accordance with its respective classification, comprises storing at least a portion of the unigrams classified as frequent unigrams in a lexicon of frequent unigrams.

16. A computerized system for establishing a search radius, the system comprising:
  one or more sensors that provide a location indicator associated with a computing device;
  a search engine that receives a query from the computing device and provides one more search results in response to the received query by searching for the one or more search results within a search area;
  one or more processors; and
  one or more computer storage media storing computer-useable instructions that, when used by the one or more processors, cause the one or more processors to perform operations comprising:
  determining that the received query fails to contain one or more non-frequent unigrams;
  determining that the received query contains one or more non-frequent bigrams;
  establishing the search radius based on the location indicator and the determination that the received query contains one or more non-frequent bigrams, the search radius and the search area being larger than if it was determined that the received query failed to contain one or more non-frequent bigrams the search radius being a distance from a particular geographic location that defines the search area of the query, wherein the particular geographic location is determined using the one or more sensors that provide the location indicator associated with the computing device; and
  providing the search engine with the search area to use in the searching.

17. The system of claim 16, wherein the one or more computer storage media further cause the one or more processors to perform additional operations comprising:
    extracting at least one unigram from the received query, wherein determining that the received query fails to contain one or more non-frequent unigrams comprises comparing the at least one unigram to a lexicon including at least one of frequent unigrams and non-frequent unigrams; and
    extracting at least one bigram from the received query, wherein determining that the received query contains one or more non-frequent bigrams comprises comparing the at least one bigram to a lexicon including at least one of frequent bigrams and non-frequent bigrams.

18. The system of claim 16, wherein the one or more computer storage media further cause the one or more processors to perform additional operations comprising:
    receiving a plurality of the entities associated with the entity index;
    extracting unigrams from at least a portion of the plurality of the entities;
    classifying at least a portion of the extracted unigrams as one of a frequent unigram or a non-frequent unigram;
    extracting bigrams from at least a portion of the plurality of the entities;
    classifying at least a portion of the extracted bigrams as one of a frequent bigram or a non-frequent bigram; and
    storing at least a portion of the classified unigrams and at least a portion of the classified bigrams, each in accordance with its respective classification.

19. The system of claim 18, wherein storing at least a portion of the classified unigrams and at least a portion of the classified bigrams, each in accordance with its respective classification, comprises storing at least a portion of the unigrams classified as frequent unigrams in a lexicon of frequent unigrams and storing at least a portion of the bigrams classified as non-frequent bigrams in a lexicon of non-frequent bigrams.

20. The system of claim 18, wherein the one or more computer storage media further cause the one or more processors to perform further operations comprising:
    for at least a portion of the extracted unigrams, establishing a count of the entities of the plurality of the entities from which each extracted unigram is extracted, wherein classifying the extracted unigrams comprises classifying a given unigram as a frequent unigram if the count of the entities from which it is extracted meets or exceeds a first threshold number and classifying the given unigram as a non-frequent unigram if the count of the entities from which it is extracted is below the first threshold number; and
    for at least a portion of the extracted bigrams, establishing a count of the entities of the plurality of the entities from which each extracted bigram is extracted, wherein classifying the extracted bigrams comprises classifying a given bigram as a frequent bigram if the count of the entities from which it is extracted meets or exceeds a second threshold number and classifying the given bigram as a non-frequent bigram if the count of the entities from which it is extracted is below the second threshold number.

\* \* \* \* \*